United States Patent [19]

Simonds

[11] 4,331,116
[45] May 25, 1982

[54] FUEL SYSTEM FOR INTERNAL COMBUSTION ENGINE

[76] Inventor: Edward L. Simonds, Broken Arrow, Okla. 74012

[21] Appl. No.: 153,137

[22] Filed: May 27, 1980

[51] Int. Cl.³ .................... F02M 31/00; F02M 15/00; F02M 9/02; F02M 45/12
[52] U.S. Cl. .................................. 123/337; 123/340; 123/557; 123/437; 261/44 G; 261/50 A; 261/DIG. 82
[58] Field of Search ............... 123/337, 340, 557, 445, 123/472, 478, 437, 438; 261/44 G, 50 A, DIG. 82, 145, DIG. 74

[56] References Cited

U.S. PATENT DOCUMENTS

| | | | |
|---|---|---|---|
| 2,578,857 | 12/1951 | Sumpter et al. | 261/44 G |
| 3,656,464 | 4/1972 | Hillborn | 261/DIG. 82 |
| 3,777,727 | 12/1973 | Kirchner et al. | 261/50 A |
| 3,861,336 | 1/1975 | Maraki et al. | 123/438 |
| 3,915,669 | 10/1975 | Minoza | 261/145 |
| 4,057,042 | 11/1977 | Aono | 123/438 |
| 4,103,658 | 8/1978 | Bereneeker | 123/557 |
| 4,116,185 | 9/1978 | Mayer et al. | 123/337 |
| 4,196,702 | 4/1980 | Bowler | 123/478 |
| 4,233,945 | 10/1980 | Beitz | 123/557 |
| 4,264,537 | 4/1981 | Watanabe et al. | 261/44 C |

Primary Examiner—R. A. Nelli
Attorney, Agent, or Firm—Head & Johnson

[57] ABSTRACT

A fuel system for an internal combustion engine and comprising a housing having a first chamber of cylindrical cross-sectional configuration with an upper air inlet port open to an air door and a lower outlet port connected to the engine intake manifold, a cylindrical spool rotatably positioned in the first chamber and having opposed openings which align with the inlet and outlet ports when the spool is in a full open position, a second chamber provided in the housing open to the heat of the engine exhaust system and separated from the first chamber by a partition, a fuel heating envelope secured within the second chamber whereby the heat of the exhaust system surrounds the envelope for heating the interior thereof, a fuel jet extending into the fuel envelope for admitting a fuel thereto, a bleed air passageway provided in the housing for directing air from the exterior thereof to the interior of the fuel envelope, a fuel nozzle secured through the wall and having one end open to the interior of the fuel heating envelope and the opposite end open to the interior of the spool for providing a fuel outlet opening in the spool between the inlet and outlet ports, a potentiometer to provide an analog voltage responsive to the position of the spool, a potentiometer to provide an analog voltage responsive to the rate of flow of the air through the housing, a probe to provide an analog signal responsive to the temperature of the fuel, a fluid injector valve in series with the source of fuel and the housing fuel inlet, and a circuit for converting the spool position, air flow, and temperature signals to an analog fuel demand signal and converting such analog fuel demand signal into a pulse DC signal for controlling the fuel injector valve.

10 Claims, 8 Drawing Figures

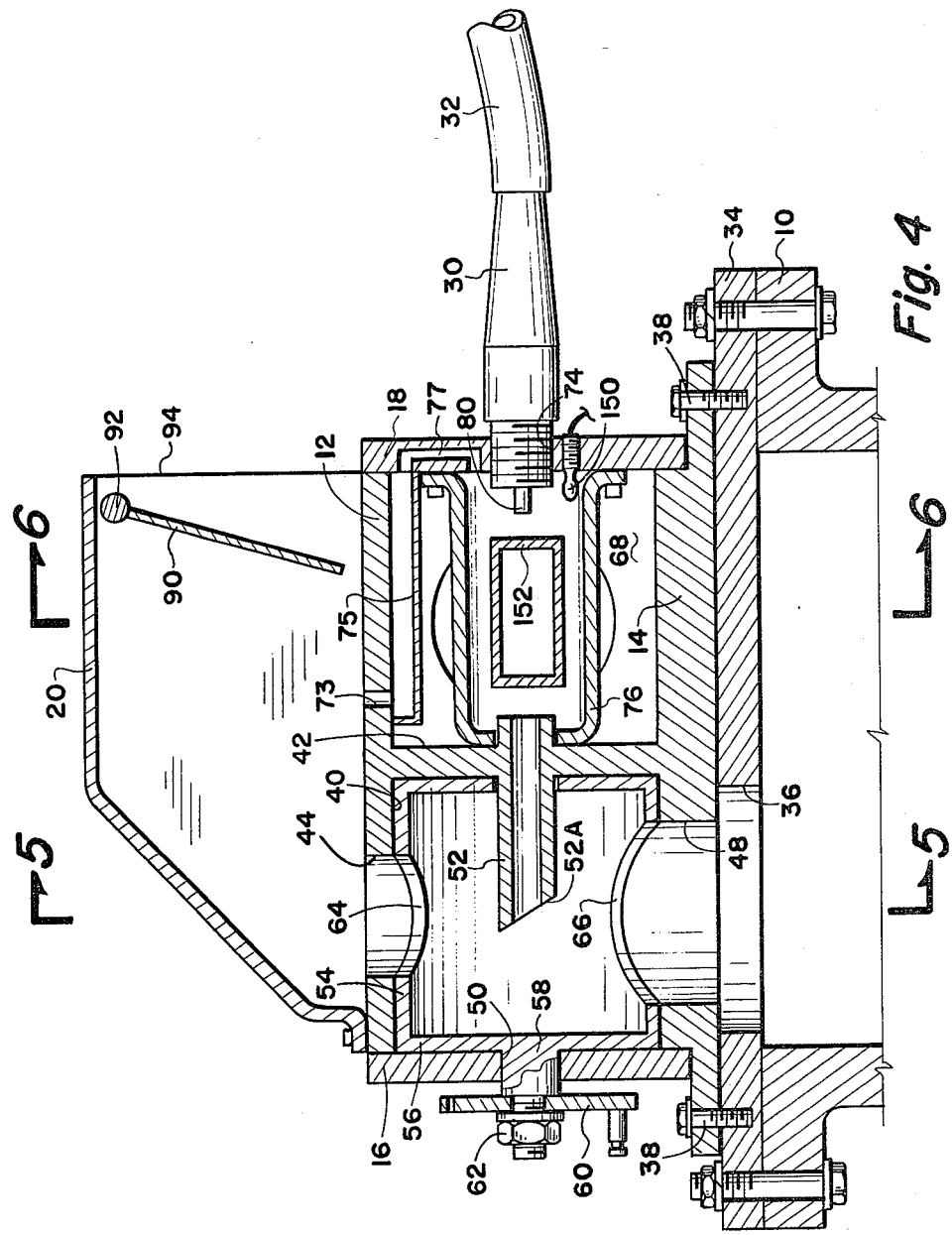

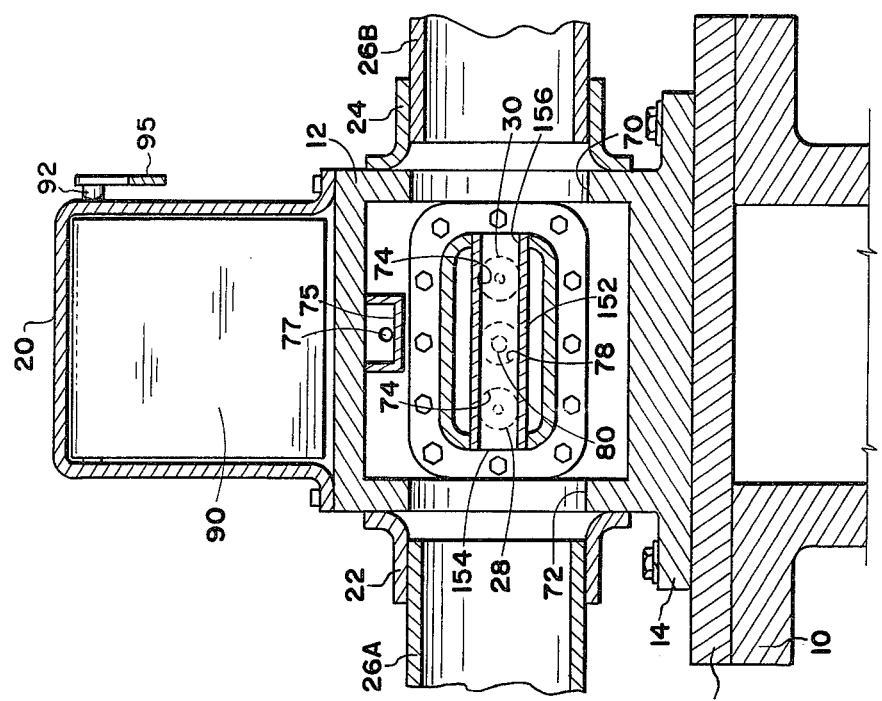
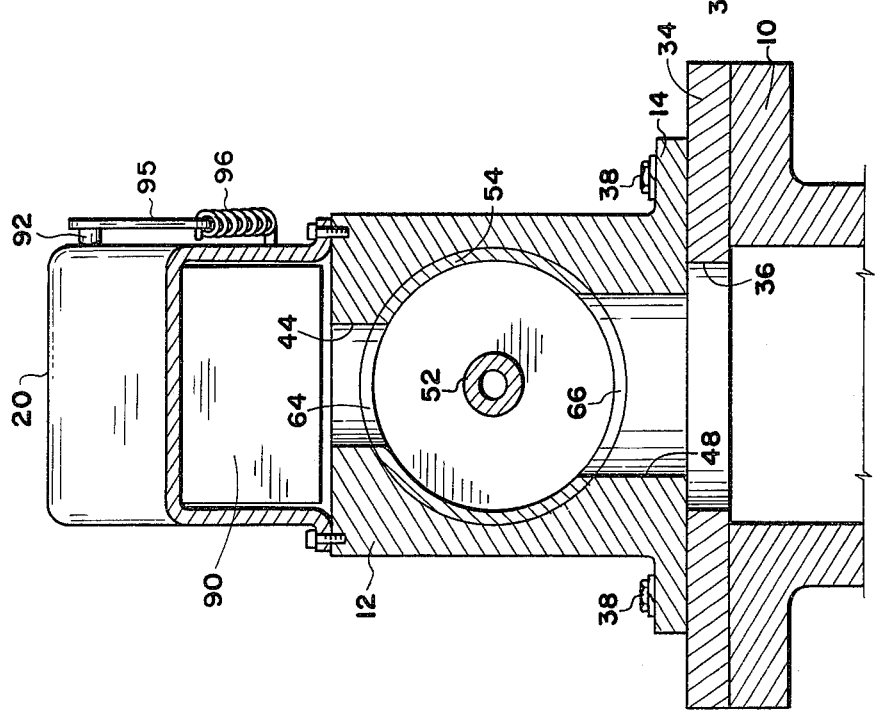

FUEL SYSTEM FOR INTERNAL COMBUSTION ENGINE

BACKGROUND OF THE INVENTION

1. Field of the Invention

This invention is related to a system for converting liquid fuel, and primarily gasoline, into an air-gas mixture for use in an internal combustion engine. The system is, in essence, a substitute for the usual carburetor found on most internal combustion gasoline engines.

2. Description of the Prior Art

Substantially all internal combustion engines utilizing gasoline as a fuel in the world today have a carburetor for converting the liquid fuel to an air-gas mixture. The carburetor attaches to an intake manifold by which the air-gas mixture from the carburetor is distributed to each of the cylinders in the engine. A carburetor serves to regulate the quantity of liquid fuel flowing therein and to cause the passage of air therethrough to at least partially vaporize the liquid fuel and to carry it into the intake manifold and thus into the cylinders of the engine where it is consumed to produce the engine power. While carburetors work satisfactorily to achieve their intended purpose, nevertheless, any liquid fuel which is unvaporized and which is carried into the engine cylinders is not completely consumed. This has two deleterious effects. First, it reduces the efficiency of the engine performance, that is, it uses more gasoline to provide a given amount of power output. Second, it increases contamination of the atmosphere because of the unburned fuel which passes out the engine exhaust.

Most carburetors are poorly equipped to change the fuel-air ratios and to properly vaporize the fuel according to changing engine conditions. The present invention is a system to replace the usual carburetor. A system is provided which produces a fuel-air mixture in an arrangement which takes into consideration at all times, different conditions under which the engine is operated. In addition, to properly control the fuel-air ratio and the quantity of fuel and air supplied under each given circumstance, the system of this invention provides increased fuel vaporization so that the amount of unburned hydrocarbons passing out of the engine exhaust is substantially reduced. Thus, the intent and purpose of this invention is to provide a fuel system which accomplishes two basic objectives, that is, first, it provides increased fuel efficiency and therefore reduced fuel consumption, and second, it attains reduced air pollution. A third benefit of the system which is somewhat secondary to the first two mentioned objectives, is to provide a fuel system so that the maximum performance output of an engine is achieved by providing ideal fuel-gas ratios at different engine speeds, temperatures, and driving conditions.

It is therefore a basic object of this invention to provide an improved fuel system for gasoline powered internal combustion engines.

More particularly, an object of this invention is to provide a fuel system for converting liquid gasoline to an air-gas mixture in proper proportions for consumption in internal combustion engines wherein the fuel-gas ratios are controlled in response to engine condition and demands.

These basic objects as well as other and more specific objects of the invention will be fulfilled in the following description and claims taken in conjunction with the attached drawings.

SUMMARY OF THE INVENTION

The present invention contemplates a novel fuel treatment system for internal combustion engines which utilizes a combustible fuel. The novel system includes a housing having a first chamber of cylindrical cross-sectional configuration with opposed end walls. The cylindrical chamber has an upper air inlet port open to an air door for receiving air therefrom, and a lower fuel mixture outlet port. The housing is adapted to be secured to an intake manifold of the engine so that the lower fuel mixture outlet port communicates with the intake manifold. A second chamber is provided in the housing and is separated from the first chamber by a wall or partition. The second chamber is open to the heat of the engine exhaust system and a fuel heating envelope is disposed in the second chamber in such a manner that the exterior of the envelope is surrounded by the heat of the engine exhaust whereby the interior of the envelope is heated during operation of the engine. A bleed air passageway is provided in the housing to direct air from the exterior thereof into the interior of the fuel heating envelope for mixing with the fuel and facilitating the movement of the fuel through the envelope. Fuel jet means extends into the fuel envelope for admitting the fuel thereto, and a fuel nozzle is secured to the partition with one end thereof being open to the interior of the fuel envelope and the opposite end thereof extending into the first chamber for providing a fuel outlet opening interposed between the inlet and outlet ports of the chamber.

A hollow spool is rotatably secured in the first chamber and is of an outer diameter corresponding to the inner diameter of the cylindrical chamber for disposition snugly thereagainst. The spool is provided with opposed openings in the cylindrical wall thereof, the openings being in alignment with the upper and lower ports of the cylindrical chamber in one rotational orientation of the spool and progressively out of alignment therewith as the spool is rotated whereby the open area of the upper and lower ports may be varied. The spool is provided with an integral boss extending from one end wall and through an opening in the end of the first chamber to provide means for connection with an accelerator pedal linkage whereby the rotational orientation of the spool is determined in response to the demand placed on the engine.

An air intake cowling is secured to the top of the housing and encases the upper inlet port. The cowling is provided with an opening for admitting air to the interior thereof, and the air door or vane is pivotally secured across the opening for measuring the flow of air to the upper inlet port. The air entering the inlet port creates a vortex at the upper portion of the interior of the spool, and passes through the spool in a direction toward the outlet port where a second vortex is created. The fuel injected into the fuel heating envelope is heated by the surrounding exhaust heat, and is delivered into the spool through the fuel nozzle for mixing with the air passing through the spool. The heating and expansion of the fuel in the fuel heating envelope provides a substantially complete vaporization of the fuel, and the fuel-air ratio being delivered to the intake manifold through the outlet port is maintained at an optimum as required by the demand of the engine.

The fuel injector means includes electrically controlled fuel injector valve means positioned in series with the fuel nozzle. A potentiometer is connected to the spool to provide an analog spool position signal. In like manner, a potentiometer is connected to the air door to provide an analog air door signal. A temperature probe provides an analog fuel temperature signal, and a temperature sensor provides an analog engine block temperature signal. These five analog signals are fed to a summation amplifier which provides an analog fuel demand signal. This signal is fed to an analog-to-digital converter providing a pulsed DC signal which is amplified and connected to the fuel injector valve.

DESCRIPTION OF THE VIEWS

FIG. 4 is a cross-sectional view of the device shown in FIGS. 1, 2 and 3, as taken along the line 4—4 of FIG. 2.

FIG. 5 is a cross-sectional view taken along the line 5—5 of FIG. 4.

FIG. 6 is a cross-sectional view taken along the line 6—6 of FIG. 4.

DETAILED DESCRIPTION

Figure 2:
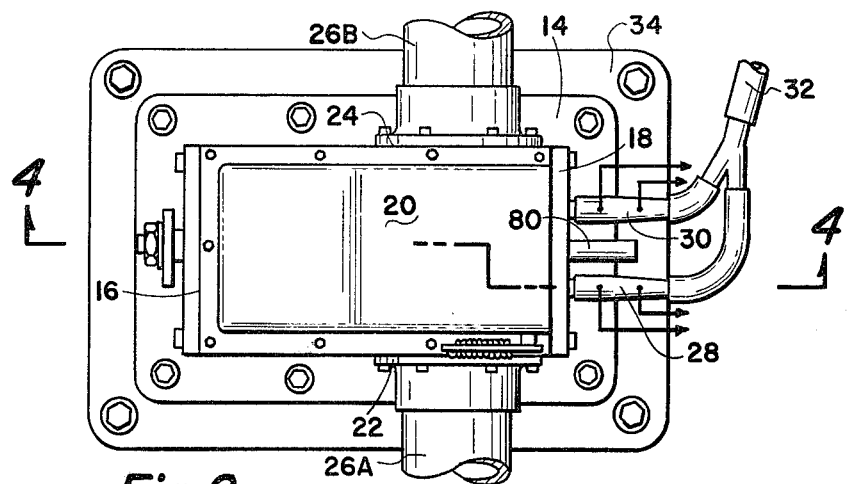
FIG. 2 is a top view of the device shown in FIG. 1.
Figure 1:
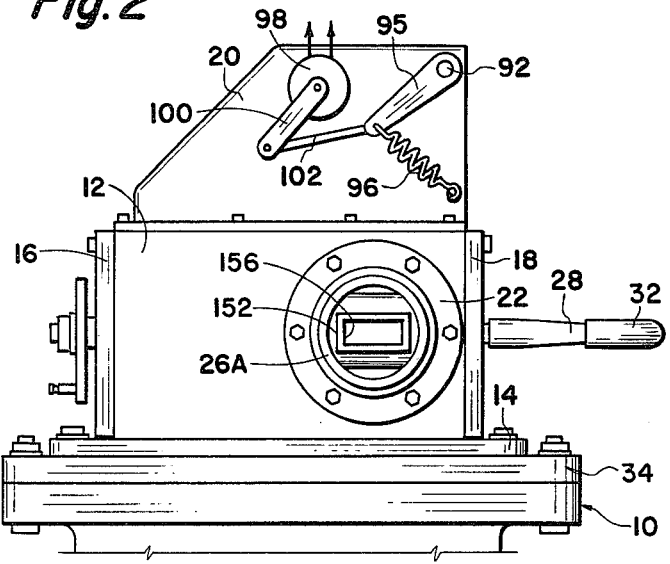
FIG. 1 is an elevational view of an apparatus employed in the fuel system of this invention shown mounted on the intake manifold of an internal combustion engine.
Figure 3:
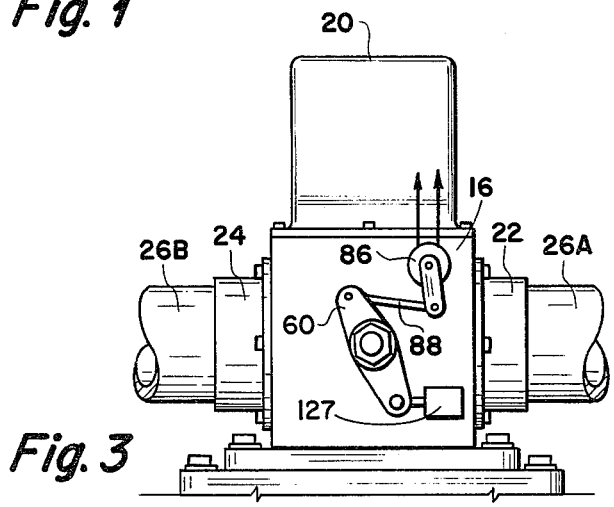
FIG. 3 is an end view of the device of FIGS. 1 and 2.

Referring to the drawings and first to FIGS. 1, 2 and 3, a preferred embodiment of the invention is illustrated.

FIG. 1 shows a device positioned on an intake manifold 10 of an internal combustion engine. The other portions of the engine are not shown since such are well known. The function of the intake manifold is to draw in a fuel-air mixture and distribute the mixture to each of the cylinders in the engine.

The device includes a housing 12 which is generally rectangular with a bottom plate 14, and end plates 16 and 18. Positioned on top of the housing 12 is an air intake cowling 20.

Secured to the housing 12 are opposed exhaust flanges 22 and 24 which receive the connection of an exhaust pipe 26A and 26B. Exhaust pipe 26A connects to the engine exhaust manifold and pipe 26B connects to the engine muffler system. Thus, exhaust gases flow from the engine through the housing and after passing through mufflers and pollution control systems, which may include catalytic converters, the exhaust gas is passed to the atmosphere.

Two fuel injector valves 28 and 30 are connected to openings in end plate 18. A fuel supply line 32 supplies combustible fuel under pressure to the injectors 28 and 30.

Referring now to FIGS. 4, 5 and 6, the internal arrangement of the apparatus is depicted. The intake manifold 10 receives an adapter plate 34 having an opening 36 therein. In the usual construction of an internal combustion engine, a carburetor is attached to the intake manifold 10 and when this system is adapted to the present type of internal combustion engine, the carburetor is removed and adapter plate 34 put in its place. The housing 12 is attached to the adapter plate by bolts 38 extending through openings in bottom plate 14.

The housing includes a cylindrical chamber 40. The chamber has opposed end walls, one end wall being formed by end plate 16 and the other end wall by partition 42. The housing includes an upper air inlet opening 44 and a lower fuel mixture outlet opening 48. Openings 44 and 48 are in alignment, and opening 48 is positioned over the opening 36 in adapter plate 34.

End plate 16 has an opening 50 which is in axial alignment with the cylindrical chamber 40. Extending from partition wall 42 and in axial alignment with the opening 50 is a tubular fuel nozzle 52. The outer end 52A is preferably cut at an inclined angle as illustrated with the other end opening being directly over the fuel mixture outlet opening 48.

Rotatably received within chamber 40 is a cylindrical spool 54. The spool is of a diameter to be snugly, yet rotatably received within the chamber and is hollow or tubular and includes an end wall 56. Extending from the end wall 56 is an integral boss portion 58 which is rotatably received in the opening 50 formed in the body end plate 16. Externally of the body is a lever 60 attached to the boss 58, such as by means of nut 62. Lever 60 is adapted to be connected to an accelerator cable (not shown) by which the operator controls the demand placed on the engine. Thus, the spool 54 performs the same function as the normal butterfly valve in a typical carburetor which is connected to the accelerator linkage. As the operator, such as the driver of a vehicle employing the engine, demands more performance, either for accelerating speed or maintaining speed on an incline, the operator pushes on the foot pedal and by cable (not shown) the lever 60 is displaced to rotate spool 54. As more performance is required from the engine, the area of the openings through the spool is increased. For this purpose, the spool includes an upper opening 64 and a lower spool opening 66. In one rotatable position of the spool, the openings 64 and 66 are aligned with the body openings 44 and 48, permitting maximum air passage therethrough. In the opposite extreme rotatable position of the spool, the openings are not aligned, thus closing the passage against all air through the body. In the practical operation of an engine, the spool is never in the fully closed position.

Housing 12 includes a preheat chamber 68 which is defined by end plate 18 at one end and the central body partition wall 42 at the other. Openings 70 and 72 (see FIG. 6) in the body communicate with flanges 22 and 24 and thus to exhaust pipes 26A and 26B by which exhaust gas passes through the preheat chamber 68. End plate 18 includes two fuel inlet openings 74, only one of which is seen in FIG. 4, by which liquid fuel is injected into the device.

Within the preheat chamber 68 a fuel heater envelope 76 is positioned. The envelope 76 is made of thin metal so as to be heat conductive and provides a closed passageway between the full inlet openings 74 and the fuel nozzle 52. A bore 73 is provided in the upper wall of the housing 12 to provide communication between the interior of the cowling 20 and the interior of a box or housing 75 secured to the inner periphery of the chamber 68, as shown in FIG. 4. The box 75 is a closed housing, but is open at one end for communication with a passageway 77 provided in the end wall 18 of the housing 12.

The passageway 77 extends from the interior of the box 75 to the interior of the fuel heating envelope 76 and directs air from the interior of the box to the interior of the envelope. The air entering the box 75 through the bore 73 is generally the atmospheric air present exteriorly of the housing 12, and is heated during passage through the box 75 by the heat of the chamber 68. Thus the air being discharged into the envelope 76 is preheated, and mixes with the fuel therein to facilitate the passage of the fuel from the jets 28 and 30 to the nozzle 52. In other words, the bleed air entering the envelope 76 from the passageway 77 gives direction to the fuel in the envelope 76.

As exhaust gas flows through the preheat chamber 68, the fuel heater envelope 76 is heated so that liquid fuel flowing therethrough is raised in temperature. Which substantially increases the vaporization rate of the fuel. The actual shape and configuration of the fuel heater envelope 76 may vary considerably; the illustrated arrangement being a rectangular cross-section housing open at one end and attached to the end plate 18 with a small diameter opening in the other end which receives a projection of the fuel nozzle 52.

In addition to the fuel inlet openings 74 there is provided, as shown in FIG. 6, an opening 78 which receives a temperature probe 80. The function of probe 80 is to provide an output voltage signal representative of the temperature of the fuel within the preheat chamber. This voltage output is termed a temperature analog signal, the purpose of which will be described subsequently.

Threadably received in the fuel inlet openings 74 are fuel injectors 28 and 30. The fuel injectors 28 and 30 are standard items utilized at the present time in the automotive industray and are small electrically controlled valves which open and close in response to uni-directional DC voltage signals. The quantity of fuel passing through the valves is determined by the ratio of the amount of time they are opened to the amount of time they are closed since the injector valves are, according to the most commonly used type, either fully opened or fully closed.

As shown in FIG. 3, a potentiometer 86 is supported to the body end plate 16 and by means of a linkage 88 is controlled in response to the lever 60 which in turn is indicative of the position of spool 54. Thus, the potentiometer 86 provides a voltage output in analog form indicative of the position of spool 54 and such voltage output is termed a spool signal.

Pivotally supported within the air intake cowling 20 is in air door vane 90 which pivots about a shaft 92. Cowling 20 provides an air opening 94 at one end thereof which is substantially closed when the air door 90 is in the vertical position. Shaft 92 extends externally of the clowing 20 (see FIG. 1) and has a lever 95 attached to it. A spring 96 urges the air door vane towards the closed position. As air is drawn through the cowling 20 by the suction of the engine when it is running, the flow of air moves the air door and quantity of air flow is reflected by the angular position of lever 95. An air door potentiometer 98 is mounted on the side of cowling 20 and has a lever 100 extending therefrom. A linkage 102 connects the potentiometer to the lever 95. The voltage potential output of potentiometer 98 is an analog voltage indicative of the position of the air door which in turn is indicative of the quantity of air flowing, and this voltage potential is referred to as an air door signal.

Figure 7:
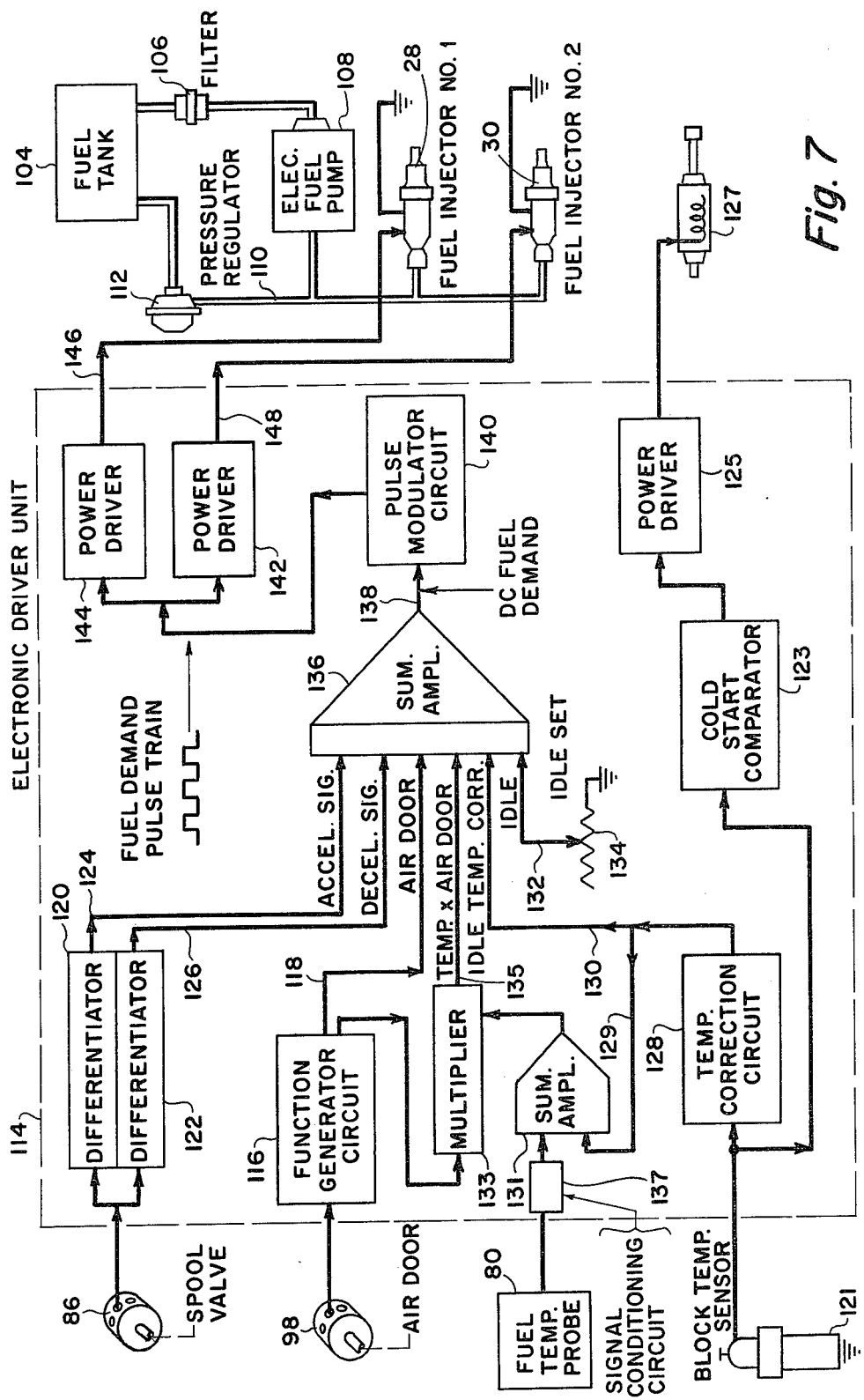
FIG. 7 is a schematic drawing of a circuit employed with the device shown in FIGS. 1-6, to control the device in such a way as to achieve maximum fuel economy and reduced air pollution.

FIG. 7 shows diagrammatically the circuitry employed in the invention to control the fuel injectors 28 and 30. While two fuel injectors 28 and 30 are shown, the number is irrelevant, as the function is the same. The number of injectors may be varied to increase the maximum quantity of fuel which may be injected, however, the circuitry to drive the fuel injectors remains the same regardless of the number employed. A fuel tank 104 provides the source of fuel for the engine which is passed through a filter 106 to an electric fuel pump 108. The pump supplies a source of liquid fuel under pressure to line 110. To ensure a steady and consistent fuel pressure, a pressure regulator 112 is employed to provide a bypass back to the fuel tank 104. The items 104 through 112 are standard equipment utilized in most internal combustion engines of the type employed in cars and trucks today. The function of the circuit of FIG. 7 is to control the fuel injectors 28 and 30 so that the fuel supplied from line 110 is injected at the optimum rate for maximum fuel economy and minimum pollution.

For this purpose an electronic driver unit 114 is utilized which is a circuit apparatus employing four signal inputs, that is, an air door signal, a spool valve signal, and two temperature signals. The air door signal is fed to a function generator 116 which modifies the analog signal from the air door potentiometer 98 to provide, on conductor 118, an analog air door signal. The analog signal from spool valve potentiometer 86 is fed to an acceleration diffferentiator circuit 120 and to a deceleration differentiator circuit 122. The acceleration differentiator circuit 120 employs the analog signal from spool valve potentiometer 86 and provides on conductor 124 an analog signal which is responsive to the acceleration demands placed on the engine as represented by the change in position of the spool valve which in turn, in an automobile or truck, is controlled by the operator foot pedal. In like manner, decelerator differentiator circuit 122 provides an analog signal on conductor 126 which is representative of the change of position of the spool valve in the opposite direction, as the operator reduces pressure on the foot pedal to decelerate the engine. The signals on conductors 124 and 126 together constitute an analog spool valve signal.

A suitable temperature sensor 121 is mounted in the proximity of the engine block (not shown) for detecting the temperature of the block. This detected temperature is compared with a preselected standard temperature by a cold start comparator 123 which is operably connected to a suitable power driver 125, which actuates a suitable solenoid 127. The solenoid 127 is mounted on the outer periphery of the housing 12 in the proximity of the linkage 88, as shown in FIG. 3. If the temperature of the block does not compare favorably with the standard temperature, as for example if the engine block is cold, the solenoid 127 will be automatically actuated for mechanical engagement with arm 60 to rotate the spool 54 in a proper direction for adjustment of the alignment between the spool ports and the housing ports for varying the open area of the air inlet and outlet ports. When the temperature of the block increases sufficiently to compare favorably with the standard temperature, or within the allowed temperature range therebetween, the solenoid is deactivated for disengagement from the arm 60. The block temperature analog voltage from the temperature sensor 121 is conveyed to a temperature correction circuit 128 which provides on conductor 130 an analog signal output representative of the temperature of the engine block. The temperature correction circuit modifies the analog signal input so that the analog temperature correction signal 130 is not directly proportional to the temperature but provides the signal input necessary for proper engine operation due to block temperature at idle speed.

A fifth analog signal input is provided on conductors 132 by an idle set potentiometer 134. This analog signal input on conductor 132 represents a minimum fuel demand requirement for proper idling of the engine when no other demand exists.

The analog voltage signal from the fuel temperature probe 80 is conveyed to a signal conditioning circuit 137 and then to a summation amplifier 131, where it is summed with the block temperature analog signal on conductor 129. The signal from the summation amplifier 131 and function generator circuit 116 are conveyed to a multiplier 133 which fees the analog signal on conductor 135 to a summation amplifier 136. The analog signal 135 provides a correction to the basic airdoor signal as a function of block and fuel temperature.

The six analog signals are applied to the summation analog amplifier 136 which provides, at output conductor 138, an analog signal which is indicative of the fuel demand. This signal is fed to a pulse modulator circuit 140 providing a pulsating DC signal to power drivers 142 and 144. The output of the power drivers is fed by conductors 146 and 148 to the fuel injectors.

Referring now to FIGS. 4 and 6, it may be desirable to install a suitable glow plug 150 in the end wall 18. The glow plug 150 is operably connected with the electrical system of the engine in any well-known manner and extends into the interior of the fuel heating envelope 76 and may be utilized for adding additional heat to the chamber when required, such as during cold weather or cold engine starting conditions. In addition, it may be desirable to provide an internal jacket or housing 152 in the fuel heating envelope 76, the jacket 152 having both ends open as shown at 154 and 156 and communicating with the engine exhaust heat. In this manner, a substantially annular fuel chamber is provided in the envelope 76 with heat existing around the outer periphery of the envelope and within the jacket 152. Thus, a greater heating area is open to the fuel and the overall volume of the fuel in ratio to the heating area is less, with a resultant increase of the efficiency of the heating of the fuel.

Thus, the system of this invention provides a unique apparatus and method of control of the same by an electronic drive unit to regulate the flow of fuel into the device in response to the air intake, the position of the spool which is responsive to the demand placed on the engine, the engine temperature, and the fuel temperature.

Figure 8:
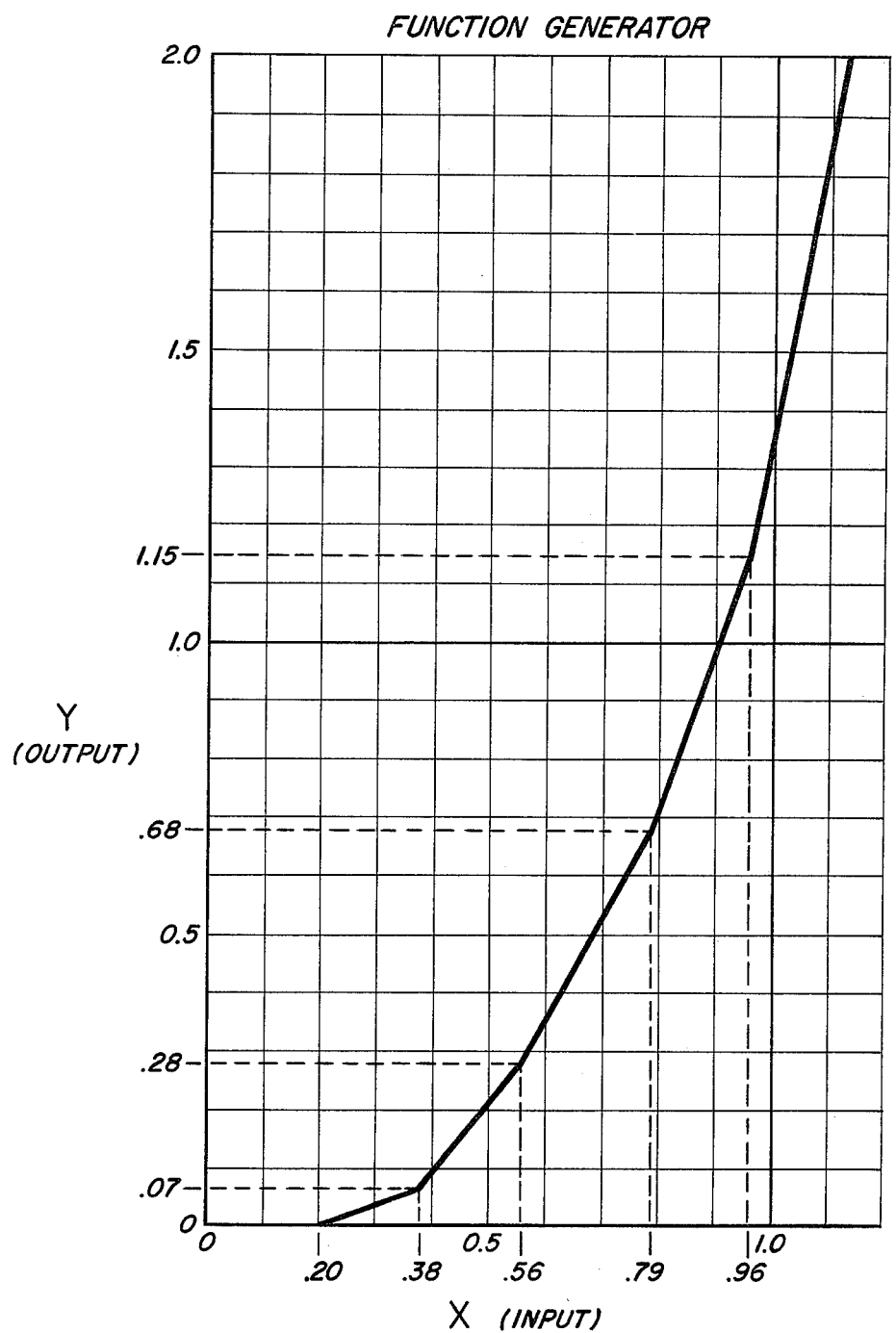
FIG. 8 is a graph of the performance of the function generator portion of the circuit of FIG. 7 showing the preferred output voltage in response to the air door analog input voltage.

The function generator circuit 116 provides an analog voltage output having a variable ratio device empirically to achieve maximum engine efficiency and minimum pollution. A typical empirically derived input-to-output relationship is illustrated in FIG. 8. Input voltage X is representative of the voltage from air door potentiometer 98. The output voltage Y is the voltage appearing on conductor 118 which is the analog air door signal fed to summation amplifier 136. This functional input-output relationship has been found to achieve significantly improved engine efficiency for the standard internal combustion engine utilized in American made automobiles at the present time. It can be seen that the function generator circuit 116 may be modified to produce any desired ratio of output to input according to engine performance characteristics and requirements. While no specific input-output relationship is shown for temperature correction circuit 128, it can be seen that in like manner, by empirically derived relationships, the output analog signal appearing on conductor 130 for various temperature signal inputs may be achieved. These ratios are not derivable from mathematical expressions but are best derived from experimental tests.

The invention set forth herein achieves all the objectives initially set forth. This system is completely unlike a typical carburetor which makes no substantial adjustments for varying engine operating conditions.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. For use on an internal combustion engine having an intake manifold, and a pressurized source of liquid fuel, a fuel treatment system for concentrating liquid fuel to a combustible air-gas mixture, comprising:

a housing having a cylindrical chamber therein with opposed end walls and having an upper air inlet and lower fuel mixture outlet opening communicating with the cylindrical chamber, an axial opening in one end wall and the other end wall having a tubular fuel nozzle extending therefrom in axial alignment with the cylindrical chamber, the inner end of the fuel nozzle being over the fuel outlet opening, the housing being adapted to attachment to the intake manifold of an engine;

a cylindrical spool of external diameter to be snugly and rotatably received in said housing cylindrical chamber, the spool being hollow to provide tubular cylindrical walls having a centrally extending straight walled bore open to the intake manifold for receiving vacuum therefrom at all times during engine operation, said spool having opposed openings in the cylindrical wall which, in one rotatable position of the spool are in alignment with said inlet and said outlet openings in said housing, the spool having an end wall having an axial boss extending therefrom rotatably received in said housing axial opening whereby the spool may be rotationally orientated in response to fuel demands of the engine to increase and decrease the area of the passageways formed by the spool and body upper openings; and means to flow fuel through said fuel nozzle.

2. A system according to claim 1 wherein said housing includes a separate fuel preheat chamber in communication with said fuel nozzle for receiving fuel in vaporized form, the chamber having an end wall opposite said fuel nozzle having an opening therein for flow of fuel therethrough, said housing having an exhaust gas inlet opening and an exhaust gas outlet opening on opposite sides thereof and including a fuel heater envelope within said housing preheat chamber of heat conductive material within said preheat chamber and providing closed communication between said fuel nozzle and said end wall opening and serving to heat fuel injected therein by heat from exhaust gases passing through the preheat chamber.

3. A system according to claim 2 including:
an air intake cowling in communication with said housing air inlet and providing an air inlet opening; and
an air door vane pivotally supported in said cowling and in proximity to said opening, said vane having one position in which said cowling air inlet is substantially closed, said vane being moved towards the fully opened position in response to the flow of air therethrough.

4. A system according to claim 3 including
an electrically controlled fuel injector valve interposed between the source of pressurized liquid fuel and said preheat chamber fuel inlet;
and means to control the injector valve to regulate the flow of fuel therethrough in response to preselected system parameters determined by air door vane positioning.

5. A system according to claim 1 wherein said housing includes a separate fuel preheat chamber in communication with said fuel nozzle, and bleed air passageway means provided in said housing for communicating air from the exterior of the housing to the interior of the fuel preheat chamber for facilitating movement of fuel through the fuel preheat chamber.

6. A system according to claim 5 and including air preheat means provided in said bleed air passageway means for heating of the air prior to injection thereof into the fuel preheat chamber.

7. For use on an internal combustion engine having an intake manifold, and a pressurized source of liquid fuel, a fuel treatment system for concentrating liquid fuel to a combustible air-gas mixture, comprising:
a housing having a cylindrical chamber therein with opposed end walls having an upper air inlet and lower fuel mixture outlet opening communicating with the cylindrical chamber, an axial opening in one end wall and the other end wall having a tubular fuel nozzle extending therefrom in axial alignment with the cylindrical chamber, the inner end of the fuel nozzle being over the fuel outlet opening, the housing being adapted to attachment to the intake manifold of the engine;
a cylindrical spool of external diameter to be snugly and rotatably received in said housing cylindrical chamber, the spool being hollow to provide tubular cylindrical walls and having opposed openings in the cylindrical wall which, in one rotatable position of the spool are in alignment with said inlet and said outlet openings in said housing, the spool having an end wall having an axial boss extending therefrom rotatably received in said housing axial opening whereby the spool may be rotated to increase and decrease the area of the passageways formed by the spool and body upper openings; and
means to flow fuel through said fuel nozzle; and
wherein said housing includes a separate fuel preheat chamber in communication with said fuel nozzle, the chamber having an end wall opposite said fuel nozzle having an opening therein for flow of fuel therethrough, said housing having an exhaust gas inlet opening and an exhaust gas outlet opening on opposite sides thereof, and including
a fuel heater envelope within said housing preheat chamber of heat conductive material within said preheat chamber and providing closed communication between said fuel nozzle and said end wall opening and serving to heat fuel injected therein by heat from exhaust gases passing through the preheat chamber; and
including an air intake cowling in communication with said housing air inlet and providing an air inlet opening; and
an air door vane pivotally supported in said cowling and in proximity to said opening, said vane having one position in which said cowling air inlet is substantially closed, said vane being moved towards the fully opened position in response to the flow of air therethrough; and
including an electrically controlled fuel injector valve interposed between the source of pressurized liquid fuel and said preheat chamber fuel inlet; and
means to control the injector valve to regulate the flow of fuel therethrough in response to preselected system parameters; and
including a potentiometer means connected to said spool providing an analog signal in response to the position of the spool;
a potentiometer means connected to said air door providing an analog signal in response to the position of the air door;
a temperature probe responsive to the fuel plasma temperature within said preheat chamber and providing an analog signal in response to the detected temperature;
a summation amplifier providing a fuel demand analog signal in response to said spool position signal, said air door signal and said temperature signal;
an analog-to-digital converter circuit providing a pulsed DC signal connected to said injector valve to regulate the flow of fuel therethrough.

8. A system according to claim 7 including:
an idle set potentiometer means providing an analog idle signal in response to an idle set, and wherein said circuit means provides a fuel demand analog signal in response to said spool position signal, said air door signal, said temperature, and said idle signal.

9. A system according to claim 7 including:
a function generator circuit receiving said air door signal providing an analog air door signal responsive to the received air door signal and a preselected valve function relationship to provide, as an output, a modified air door signal which is fed to said summation amplifier.

10. A system according to claim 7 including:
a first differentiator circuit having an input and an output, the input being connected to receive said spool position signal and the output being connected to said summation amplifier, the output signal being responsive to the rate of acceleration change in the spool position; and
a second differentiation circuit having an input and an output, the input being connected to receive said spool position signal and the output being connected to said summation amplifier, the output signal being responsive to the rate of deceleration change in the spool position, whereby the spool position signal is in the form of separate acceleration and deceleration analog signals fed to said summation amplifier.

* * * * *